United States Patent
Lee et al.

(10) Patent No.: US 11,823,641 B2
(45) Date of Patent: Nov. 21, 2023

(54) DISPLAY DEVICE AND DRIVING METHOD THEREFOR

(71) Applicant: SAMSUNG ELECTRONICS CO., LTD., Suwon-si (KR)

(72) Inventors: Sunrock Lee, Suwon-si (KR); Yongmin Jung, Suwon-si (KR); Hyeongsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 17/422,350

(22) PCT Filed: Oct. 30, 2019

(86) PCT No.: PCT/KR2019/014471
§ 371 (c)(1),
(2) Date: Jul. 12, 2021

(87) PCT Pub. No.: WO2020/171344
PCT Pub. Date: Aug. 27, 2020

(65) Prior Publication Data
US 2022/0114983 A1    Apr. 14, 2022

(30) Foreign Application Priority Data
Feb. 22, 2019   (KR) .................. 10-2019-0021261

(51) Int. Cl.
*G09G 3/36*        (2006.01)
*G02F 1/1335*    (2006.01)

(52) U.S. Cl.
CPC ..... *G09G 3/3696* (2013.01); *G02F 1/133528* (2013.01); *G09G 2300/023* (2013.01)

(58) Field of Classification Search
CPC .. G09G 3/3696; G09G 3/36; G09G 2300/023; G09G 2300/043;
(Continued)

(56) References Cited

U.S. PATENT DOCUMENTS 5,973,660 A    10/1999   Hashimoto
6,456,344 B1    9/2002   Nemoto et al.
(Continued)

FOREIGN PATENT DOCUMENTS

JP            3533563 B2    5/2004
JP        2008-129521 A    6/2008
(Continued)

OTHER PUBLICATIONS

Search Report (PCT/ISA/210) dated Feb. 17, 2020 issued by the International searching Authority in counterpart International Application No. PCT/KR2019/014471.
(Continued)

*Primary Examiner* — Pegeman Karimi
(74) *Attorney, Agent, or Firm* — Sughrue Mion, PLLC

(57) ABSTRACT

The display device of the present disclosure comprises: a display panel; a backlight for providing light to the display panel; a liquid crystal panel which is arranged between the display panel and the backlight and which includes a first transparent electrode sheet, a second transparent electrode sheet, and a liquid crystal layer formed between the first and second transparent electrode sheets and arranged according to the difference in voltages applied to the first and second transparent electrode sheets; and a control unit for applying a driving voltage to a block, which corresponds to a region of the display panel, from among a plurality of blocks of the first transparent electrode sheet in order to apply a voltage to a specific point inside the block, wherein the voltage applied to the specific point is determined on the basis of the distance between a point of the first transparent electrode sheet.

12 Claims, 9 Drawing Sheets

(58) Field of Classification Search
CPC .......... G09G 2330/02; G09G 2360/142; G02F 1/13; G02F 1/133528
See application file for complete search history.

(56) References Cited

U.S. PATENT DOCUMENTS

| | | | |
|---|---|---|---|
| 8,803,820 | B2 | 8/2014 | Suzuki |
| 10,109,241 | B2 | 10/2018 | Yoo et al. |
| 2016/0195756 | A1* | 7/2016 | Oh .................... G02F 1/134309 349/123 |
| 2017/0032744 | A1* | 2/2017 | Yoo ....................... G09G 3/2007 |
| 2017/0343839 | A1* | 11/2017 | Nam ................... G02F 1/13471 |
| 2017/0343866 | A1* | 11/2017 | Nam ..................... G02F 1/1336 |

FOREIGN PATENT DOCUMENTS

| | | |
|---|---|---|
| KR | 1998-018754 A | 6/1998 |
| KR | 10-0942842 B1 | 2/2010 |
| KR | 10-2011-0097390 A | 8/2011 |
| KR | 10-1224526 B1 | 1/2013 |
| KR | 10-1226989 B1 | 1/2013 |
| KR | 10-2017-0015647 A | 2/2017 |
| KR | 10-2017-0025545 A | 3/2017 |
| KR | 10-2018-0078926 A | 7/2018 |
| KR | 10-1880226 B1 | 7/2018 |
| KR | 10-0937709 B1 | 1/2020 |

OTHER PUBLICATIONS

Written Opinion (PCT/ISA/237) dated Feb. 17, 2020 issued by the International searching Authority in counterpart International Application No. PCT/KR2019/014471.

Communication dated Mar. 9, 2023 by the Korean Intellectual Property Office for Korean Patent Application No. 10-2019-0021261.

* cited by examiner

FIG. 3B

| ITEM | DISTANCE (mm) | VOLTAGE (V) | RESISTER (Ω) | CURRENT (A) |
|---|---|---|---|---|
| AB | 10 | 1.48 | 35 | 0.042 |
| AC | 30 | 2.13 | 46 | 0.046 |
| AD | 50 | 2.52 | 52 | 0.048 |
| AE | 100 | 4.95 | 72 | 0.069 |

DISPLAY DEVICE AND DRIVING METHOD THEREFOR

TECHNICAL FIELD

The disclosure relates to a display device and a driving method therefor. More particularly, the disclosure relates to a display device for improving contrast ratio and visibility at a boundary of a pixel and a driving method therefor.

BACKGROUND ART

The display device may be a device configured so that digital or analog image signals received externally, various image signals stored as compressed files of various format in embedded storage devices, or the like are processed and displayed on a screen. The digital or analog image signal which is received externally may be a signal or the like transmitted from a broadcast company, digital satellite broadcast signal, various external devices (e.g., set-top box, disk player, mobile device, PC, etc.), or a server based on an internet protocol.

Recently, despite various elements such as a Thin Film Transistor Liquid Crystal Display (TFT-LCD; hereinafter, referred to as LCD), a Plasma Display Panel (PDP), an Organic Light Emitting Diode (OLED), a Micro-LED, Quantum Dots (QD), or the like being adopted, LCD is still mainstream in terms of excellent cost competitiveness, excellent high luminance expression capability, and excellent power efficiency, and showing high versatility and less Burn-In phenomenon.

In the case of the LCD, in order to drive a pixel having a specific brightness and color as a dot forming an image, liquid crystals formed in both electrodes may be arranged toward a certain direction by a potential difference between a pixel electrode and a common electrode, and the amount of light transmitted, which is output from a Back Light Unit (BLU) according to the direction of the arranged liquid crystals, may be controlled.

However, in the case of the LCD, in order to drive an image (or pixel) of a black color, light is to be first output from the BLU, and in blocking light which is output by arranging the liquid crystals in a specific direction, there is the problem of not being able to fully block light. That is, even if data of the image signal input is the same, the black color displayed by the LCD is brighter than the black color displayed by OLED, Micro LED, or the like which controls the self-light emitting element to not output light from the beginning. Accordingly, compared to the OLED, Micro-LED, or the like, the LCD has the problem of contrast ratio being low which is a difference in brightness (luminance) between a full white and a full black which may be expressed in a display.

A resolution of the display may be defined by a number of pixels (Pixels Per Inch, PPI) or a number of dots (Dots Per Inch, DPI) expressed in 1 inch. In case the resolution of the display is low or the size of the display is large, there is the problem of a boundary between pixels being visible.

DISCLOSURE

Technical Problem

Aspects of the disclosure are to address at least the above-mentioned problems and/or disadvantages and to provide at least the advantages described below. Accordingly, an aspect of the disclosure is to provide a display device with improved contrast ratio and visibility at a boundary of a pixel and a driving method therefor.

Technical Solution

According to an embodiment, a display device includes a display panel configured to display an image, a back light configured to provide light to the display panel, a liquid crystal panel disposed between the display panel and the back light, and include a first transparent electrode sheet, a second transparent electrode sheet, and a liquid crystal layer formed between the first and second transparent electrode sheets and arranged according to a voltage difference applied to the first and second transparent electrode sheets, and a controller configured to apply a driving voltage to a block to apply a voltage to a specific point within the block corresponding to an area of the display panel on which the image is displayed from among a plurality of blocks of the first transparent electrode sheet, and the voltage applied to the specific point is determined based on a distance between a point to which the driving voltage is applied and the specific point in the first transparent electrode sheet.

The controller may be configured to apply driving voltage to a plurality of points of the first transparent electrode sheet which corresponds to the block.

The plurality of points may include a first point to which a first voltage is applied and a second point to which a second voltage greater than the first voltage is applied, and the voltage which is applied to the specific point may get relatively greater as the specific point gets closer to the second point than the first point.

The liquid crystal layer which corresponds to the specific point may be arranged so that the extent to which the liquid crystal layer is arranged from the first direction to the second direction gets relatively greater according to a difference in voltage applied to the specific point and voltage applied to the second transparent electrode sheet.

The first and second directions may be configured to correspond to a voltage applied to the second transparent electrode sheet and a driving voltage applied to the block of the first transparent electrode sheet, respectively.

The controller may be configured to apply the driving voltage to the block as an alternating current voltage according to a brightness value of the image, and apply the driving voltage to the block for the voltage of the second transparent electrode sheet to be an average value of a maximum value and a minimum value of the driving voltage.

The display device may further include a plurality of polarizing sheets, and the plurality of polarizing sheets may include a first polarizing sheet configured to be disposed between the back light and a back surface of the liquid crystal panel to transmit light of the first polarization direction and block light of a different polarization direction with the first polarization direction among the light provided from the back light, a second polarizing sheet configured to be disposed between a front surface of the liquid crystal panel and a back surface of the display panel to transmit light of a second polarization direction orthogonal with the first polarization direction and block light of different directions with the second polarization direction among the light transmitted through the liquid crystal panel, and a third polarizing sheet configured to be disposed at a front surface of the display panel to transmit light of the first polarization direction and block light of a different direction with the first polarization direction of the light transmitted through the display panel.

According to an embodiment, a driving method of a display device includes applying a driving voltage to a block which corresponds to an area on which an image is displayed from among a plurality of blocks of a first transparent electrode sheet included in a liquid crystal panel, applying a voltage which is determined based on a distance between a point to which the driving voltage is applied and a specific point within the block in the first transparent electrode sheet to the specific point, arranging a liquid crystal layer which corresponds to a specific point according to a difference in voltage applied to the specific point and voltage applied to a second transparent electrode sheet among the liquid crystal layer formed between the first transparent electrode sheet and the second transparent electrode sheet, and displaying the image by providing light to a display panel through the liquid crystal panel.

The applying the driving voltage may include applying the driving voltage to a plurality of points of the first transparent electrode sheet which corresponds to the block.

The plurality of points may include a first point to which a first voltage is applied and a second point to which a second voltage greater than the first voltage is applied, and the voltage which is applied to the specific point is characterized in that the voltage applied to the specific point gets relatively greater as the specific point gets closer to the second point than the first point.

The liquid crystal layer which corresponds to the specific point may be arranged so that the extent to which the liquid crystal layer is arranged from the first direction to the second direction gets relatively greater according to a difference in voltage applied to the specific point and voltage applied to the second transparent electrode sheet.

The first and second directions may correspond to a voltage applied to the second transparent electrode sheet and a driving voltage applied to the block of the first transparent electrode sheet, respectively.

The applying the driving voltage may include applying the driving voltage to the block as an alternating current voltage according to a brightness value of the image, and applying the driving voltage to the block for the voltage of the second transparent electrode sheet to be an average value of a maximum value and a minimum value of the driving voltage.

The displaying the image may include providing to the liquid crystal panel by transmitting light of the first polarization direction and blocking light of a different polarization direction with the first polarization direction of the light, providing to the display panel by transmitting light of the second polarization direction orthogonal with the first polarization direction and blocking light of a different direction with the second polarization direction of the light which is transmitted through the liquid crystal panel, and displaying the image by transmitting light of the first polarization direction and blocking light of a different direction with the first polarization direction of the light which is transmitted through the display panel.

Effect of Invention

According to one or more embodiments as described above, a display device in which luminance of light in a block may be continuously changed by using driving in block units through a high-resistance transparent electrode sheet and a driving method therefor may be provided.

In addition the display device of the disclosure may be configured to use a display standard of a liquid crystal panel of a resolution lower than a display standard of a display panel to enhance a contrast ratio and improve visibility on a boarder surface of a low-resolution while lowering manufacturing costs.

DESCRIPTION OF DRAWINGS

FIG. 3B is a diagram illustrating a driving of a first transparent electrode sheet according to an embodiment of the disclosure;

DETAILED DESCRIPTION OF EXEMPLARY EMBODIMENTS

Figure 1:
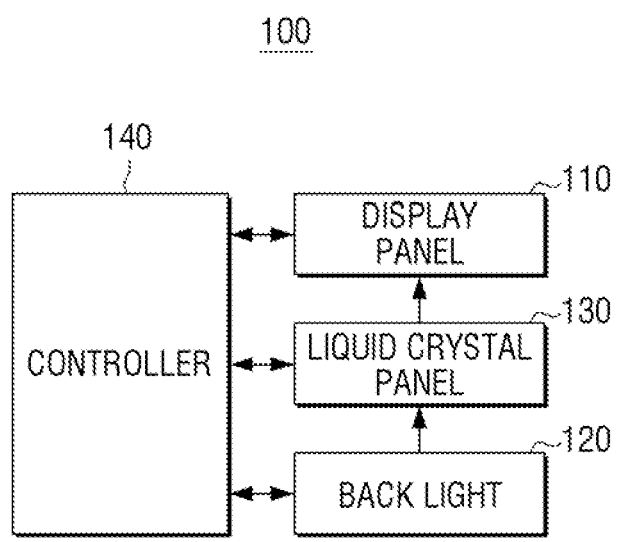
FIG. 1 is a block diagram illustrating a display device according to an embodiment of the disclosure.

In describing the disclosure, in case it is determined that in describing embodiments, detailed description of related known technologies may unnecessarily confuse the gist of the disclosure, the detailed description will be omitted. Further, one or more embodiments below may be modified to variously different forms, and the scope of technical idea of the disclosure is not limited to the embodiments specifically described herein. Rather, the embodiments herein more thoroughly complete the disclosure, and are provided to completely convey to those of ordinary skill in the art the technical idea of the disclosure.

It is to be noted that the technology described herein is not for limiting the scope of the disclosure to a specific embodiment, but should be interpreted to include all modifications, equivalents and/or alternatives of the embodiments. In describing the embodiments, like reference numerals may be used to refer to like elements.

Expressions such as "first," "second," "1st," "2nd," or so on used in the disclosure may be used to refer to various elements regardless of order and/or importance, and may be used only to distinguish one element from another, but not limit the corresponding elements.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

In the disclosure, a singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element). On the other hand, when a certain element (e.g., first element) is indicated as "directly coupled with/to" or "directly connected to" another element (e.g., second element), it may be understood as another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

FIG. 1 is a block diagram illustrating a display device according to an embodiment.

Referring to FIG. 1, the display device 100 of the disclosure may include a display panel 110, a back light 120, a liquid crystal panel 130, and a controller 140. For example, the display device 100 may be implemented as a monitor of various types capable of processing an image including a TV, a smart phone, a portable terminal, a mobile terminal, a personal information terminal (personal digital assistant (PDA)), a portable multimedia player (PMP) terminal, a computer, a notebook computer, a note pad, a Wibro terminal, a tablet personal computer (tablet PC), a smart TV, or the like.

The display panel 110 may be a configuration for displaying an image, and may be configured to pass or block light provided from a back light 120 according to a driving signal of the controller 140.

Specifically, the display panel 110 may be divided into a plurality of pixels (or sub pixels) in which data lines of a P number and data lines of a Q number are arranged in matrix form (P×Q; P and Q being a natural numbers) in a crossing structure, and light provided from the back light 120 may be passed or blocked in pixel (or sub pixel) units. Each of the pixels represent a specific color and brightness at a specific position of the displayed image, and accordingly, the image may be displayed in an area (at least one pixel) of the display 110.

The display panel 110 may be implemented as a liquid crystal display (LCD) panel. Here, the LCD panel may include a pixel electrode (not shown), a common electrode (not shown), a switching device (not shown), a liquid crystal layer (not shown), and a color filter (not shown).

Specifically, the switching device (e.g., thin film transistor (TFT), etc.) may be operated on/off according to the driving signal of the controller 140, and the driving voltage may be applied to the pixel electrode of the LCD panel according to the driving of the switching channel (e.g., when a voltage higher than a threshold voltage is applied to a gate of the TFT). Then, the LCD panel may be configured to drive the liquid crystal layer formed between the pixel electrode and the common electrode to rotate according a voltage difference applied to the pixel electrode and the common electrode.

When the light (e.g., white light) provided by the back light 120 passes the liquid crystal layer, an oscillation direction and intensity (or brightness, luminance) of light may be changed according to the rotation (direction or degree) of the liquid crystal layer. Further, when the light which passed the liquid crystal layer passes the color filter (e.g., red, blue and green, etc.), a sub pixel having a specific color (e.g., one of red, green and blue) by the color filter may be formed, and a pixel having a specific color and brightness according to a combination of sub pixels may be formed.

For example, the LCD panel may be implemented as a normally black panel which blocks light of the back light 120 if there is no voltage difference of the pixel electrode with the common electrode, and a normally white panel which blocks light of the back light 120 if there is a voltage difference of the pixel electrode with the common electrode. In addition, based on an electric field according to a voltage difference of the pixel electrode and the common electrode being applied, the liquid crystal layer may be implemented in a homeotropic alignment structure in which the liquid crystal molecules aligned in a vertical direction rotates in a horizontal direction based on an axis which is horizontal to the panel, or implemented in a homogeneous alignment structure in which liquid crystals aligned in the horizontal direction rotates in a different horizontal direction based on an axis which is vertical to the panel. For example, the LCD panel may be implemented as a Vertical Alignment (VA), an In-plane Switching (IPS), a Plane to Line Switching (PLS), an Advanced Hyper-Viewing Angle (AH-VA), a Twisted Nematic (TN), or the like. At this time, the LCD panel may dispose (or include) a polarizing sheet which only transmits a specific polarization direction of light to the front surface and back surface of the LCD panel and blocks light of a different polarization direction, and the polarization direction of the polarizing sheet which is disposed to the front surface and back surface of the LCD panel may be in directions orthogonal to each other.

Accordingly, the display panel 110 may be configured to drive the liquid crystal layer in a pixel or sub pixel unit.

The back light 120 may be configured to provide light to the display panel 110.

Specifically, the back light 120 may be configured to provide light having a specific luminance to a specific position (e.g., pixel) of the display panel 110 and/or a specific position (e.g., block) of the liquid crystal panel 130 according to the driving signal of the controller 140.

For example, the back light 120 may be configured to provide light to the display panel 110 through the liquid crystal panel 130. That is, when the back light 120 outputs (emits) light according to the control of the controller 140, the light first reaches the liquid crystal panel 130 disposed between the back light 120 and the display panel 110, and then the light which passed (or transmitted) the liquid crystal panel 130 may reach the display panel 110. Here, the light which passed (or transmitted) the liquid crystal panel 130 may be changed in terms of the oscillation direction of light, the intensity, or the like according to the driving of the liquid crystal panel 130.

To this end, the back light 120 may be disposed at the back surfaces of the display panel 110 and the liquid crystal panel 130, and may include a plurality of light sources. For example, the back light 120 may be configured to individually drive the light source through a local dimming and emit light. Each of the light sources may be in charge of a specific position (or area) so that light emitted from the plurality of light sources may be provided to a specific position (or area) of an image divided (or classified) into a plurality of pixels (and/or a plurality of blocks).

The plurality of light sources may be implemented as a plurality of light emitting diodes (LEDs). Here, the plurality of LEDs may be arranged (direct type structure) at a certain distance in a horizontal and vertical matrix form (M×N; M and N being natural numbers) on a flat surface or curved surface, or arranged (edge type structure) at a certain distance on a linear line or a curved line.

The back light 120 may further include a reflector sheet for reusing the scattered light of the light source, a light guide plate (LGP) for transferring light of the light source to a specific area, a diffuser plate for transferring by dividing light and evenly distributing, a prism sheet for controlling a viewing angle of light, or the like according to the structure.

The liquid crystal panel 130 may be disposed between the display panel 110 and the back light 120. Specifically, the liquid crystal panel 130 may be disposed between the display panel 110 and the back light 120 so that light provided from the back light 120 may be transferred to the display panel 110 through the liquid crystal panel 130.

The liquid crystal panel 130 may be configured to pass or block the light provided from the back light 120 to a specific position (e.g., block) of the liquid crystal panel 130 according to the driving signal of the controller 140. At this time, the luminance of light passing through a point which continues within the block of the liquid crystal panel 130 may be changed continuously (or gradually) according to the position at which light is passed.

Figure 2:
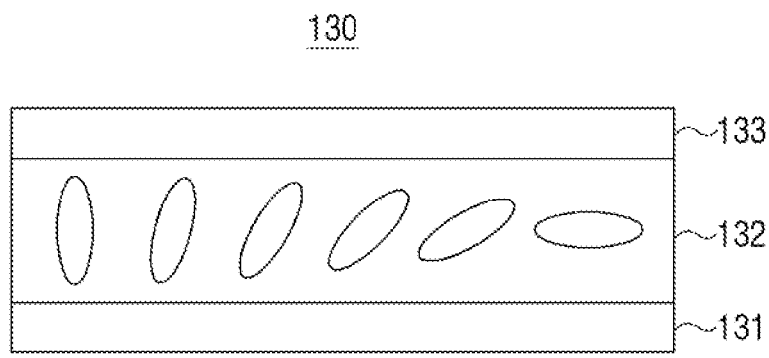
FIG. 2 is a diagram illustrating a liquid crystal panel according to an embodiment of the disclosure.

Referring to FIG. 2, the liquid crystal panel 130 may include a first transparent electrode sheet 131, a second transparent electrode sheet 133, and a liquid crystal layer 132, and the detailed description will be provided below.

The controller 140 may be configured to control the overall operation of the display device 100.

Specifically, the controller 140 may be configured to process, based on an image signal for displaying an image being received in the display device 100, the image signal and generate RGB data and a control signal, and based on the RGB data and the control signal, generate a driving signal on the display panel 110, a driving signal on the back light 120, and a driving signal on the liquid crystal panel 130. A data enable (DE) signal, a horizontal synchronization (Hsync) signal, a vertical synchronization (Vsync) signal, and a main clock (MCLK) signal may be included.

The image signal may be received from a broadcast receiver (not shown), an interface (not shown) or a memory (not shown) of the display device 100. Here, the broadcast receiver may be configured to receive a broadcast signal from a broadcast company or a satellite via wired or wireless means, and separate the received broadcast signal to an image signal, an audio signal, and an additional information signal. The interface may be a configuration capable of receiving an image signal from an external image source through a wired interface (e.g., high definition multimedia interface (HDMI), digital visual interface (DVI), low voltage differential signals (LVDS), D-subminiature (D-sub), thunderbolt, optical communication, Firewire, a universal serial bus (USB), etc.) or a wireless interface (e.g., Wi-Fi, Bluetooth, or wireless communication of 3G, 4G, 5G, etc.). The memory may be store with various instructions necessary in the operation of the controller 140 or data of an image signal, or the like. The memory may be implemented as a non-volatile memory, a volatile memory, a flash-memory, a hard disk drive (HDD), a solid state drive (SSD), or the like. The memory may be accessed by the controller 140 or a separate processor (not shown), and reading/writing/modifying/deleting/updating of data or the like may be performed. In the disclosure, the term 'memory' may include the memory 140 provided inside the display device 100, or a micro SD card, an SD card, a USB device, or the like which is detachable from the display device 100.

The controller 140 may be configured to control the back light 120 to provide light having a specific luminance to a specific position (e.g., pixel) of the display panel 110 and/or a specific position (e.g., block) of the liquid crystal panel 130 according to the driving signal on the back light 120.

The controller 140 may be configured to control, based on light which passed the liquid crystal panel 130 reaching a specific position (pixel) of the display panel 110, light so that it passes a specific position (pixel) of the display panel 110 or is blocked according to the driving signal on the display panel 110.

The controller 140 may be configured to control so that light which is provided from the back light 120 passes a specific position (block) of the liquid crystal panel 130 or is blocked according to the driving signal on the liquid crystal panel 130. At this time, the luminance of light which passes continuous points within the block of the liquid crystal panel 130 may be changed continuously (or gradually, gradient behavior) according to the position at which light is passed.

In the description above, the operations performed by the controller 140 has been described as being performed by the controller 140 on its own, but this is merely an embodiment, may be performed by dividing the above-described operations by configurations which are independent from one another such as a processor (not shown), a timing controller (not shown), a gate driver (not shown), a data driver (not shown), and the like.

According to an embodiment of the disclosure as described above, when light emitted from the back light 120 passes a specific area of the liquid crystal layer 132, a display device in which the luminance of light may be continuously changed according to the position at which light is passed within the specific area may be provided. Accordingly, a display device with improved contrast ratio and visibility on a low-resolution boundary surface may be provided.

The disclosure will be described in greater detail below with reference to the accompanied drawings.

FIG. 2 is a diagram illustrating the liquid crystal panel 130 according to an embodiment.

Referring to FIG. 2, the liquid crystal panel 130 may include the first transparent electrode sheet 131, the second transparent electrode sheet 133, and the liquid crystal layer 132.

The first transparent electrode sheet 131 may be a configuration for continuously changing the luminance of light which passes the liquid crystal layer 132 and is spatially continued according to the driving of the liquid crystals by driving the liquid crystals of the liquid crystal layer 132 according to the voltage difference applied to the first transparent electrode sheet 131 and the second transparent electrode sheet 133.

To this end, the first transparent electrode sheet 131 may transmit light of a visible light area optically and may be implemented in a transparent electrode material having a high resistance characteristic electrically. For example, the first transparent electrode sheet 131 may have a transmittance (%) of 80% or more, and may be implemented as Indium Tin Oxide (ITO), Graphene, Carbon Nanotubes (CNT), Zinc Oxide (ZnO), Tin Dioxide (SnO2), Titanium Dioxide (TiO2), Ga-doped ZnO (GZO), Al-doped ZnO (AZO), a multi-layered thin film of a metal oxide structure, or the like having a surface resistance (ohm/sq) of 100 ohm/sq or more. However, this is merely one embodiment, and the light transmittance and surface resistance of the first transparent electrode sheet 131 may be variously modified and implemented.

Specifically, the first transparent electrode sheet 131 may be divided into a plurality of blocks in matrix form, and the driving voltage may be independently applied to each of the blocks (or point corresponding to block) by the controller 140.

For example, the first transparent electrode sheet 131 may be divide into the plurality of blocks so that each blocks may be matched the plurality of pixels of the whole pixels of the display panel 110 which is disposed on a top surface of the first transparent electrode sheet 131. For example, assuming that the whole pixel of the display panel 110 is 3840×2160, the whole block of the first transparent electrode sheet 131 may be divided as 1280×720, and one block may be matched per 3×3 plurality of pixels based on the position of the block and the pixel (or coordinates). However, this is merely one embodiment, and the number of pixels and blocks may be variously modified and implemented.

The first transparent electrode sheet 131 may be implemented as one electrode sheet (or thin film) with respect to the whole plurality of blocks unlike the display panel 110 having a pixel electrode which is separated from one another per each pixels.

In this case, when the driving voltage is applied to a plurality of points (e.g., vertex of the block, point on the edge of the block, or the like) of the first transparent electrode sheet 131 which corresponds to the block of the first transparent electrode sheet 131, voltage may be applied to a specific point within the block according to the driving voltage.

The voltage which is applied to a specific point may be determined based on a distance between the point to which the driving voltage is applied and the specific point. Specific descriptions thereof will be provided below with FIGS. 3A and 3B.

The liquid crystal layer 132 may be a configuration for blocking or passing light according to the driving of the liquid crystals by driving the liquid crystals according to the difference in voltage applied to the block of the first transparent electrode sheet 131 and voltage applied to the second transparent electrode sheet 133. At this time, the liquid crystal layer 132 may be driven in block units of the first transparent electrode sheet 131.

Specifically, the liquid crystal layer 132 may be driven, based on an electric field being applied according to a voltage difference applied to the first transparent electrode sheet 131 and the second transparent electrode sheet 133, in a homeotropic alignment in which the liquid crystal molecules aligned in the vertical direction rotates in the horizontal direction based on an axis which is horizontal to the liquid crystal panel 130, implemented in a homogeneous alignment in which liquid crystals aligned in the horizontal direction rotates in a different horizontal direction based on an axis which is vertical to the panel, or the like. Unless otherwise specified, the same description on the liquid crystal layer of the above-described display panel 110 may be identically applied to the liquid crystal layer 132.

The second transparent electrode sheet 133 may be a configuration for driving the liquid crystals of the liquid crystal layer 132 according to the voltage difference applied to the first transparent electrode sheet 131 and the second transparent electrode sheet 133.

To this end, the whole of second transparent electrode sheet 133 may be implemented as one electrode so that common voltage (Vcom) is applied throughout the whole area. That is, the second transparent electrode sheet 133 may be a material of high conductivity and configured such that the same (substantially the same) common voltage may be applied regardless of its position. In addition, the second transparent electrode sheet 133 may transmit light of a visible light area optically. For example, the second transparent electrode sheet 133 may be implemented in Indium Tin Oxide (ITO), Graphene, Carbon Nanotubes (CNT), metals, conductive polymers, or the like.

Referring back to FIG. 1, the controller 140 may be configured to apply the driving voltage to the block of the first transparent electrode sheet 131 from among the blocks which correspond to an area of the display panel 110 in order to apply voltage to a specific point within the block which corresponds to the area of the display panel 110 on which an image is displayed from among a plurality of blocks of the first transparent electrode sheet.

The block may be an area of the display panel 110 on which an image is displayed as described above, and may be matched to the plurality of pixels of the display panel 110. For example, each of the blocks may be matched to the plurality of pixels of a 4×4 matrix form.

Here, the controller 140 may be configured to apply driving voltage to the plurality of points of the first transparent electrode sheet 131 which corresponds to the block. For example, the plurality of points may be points positioned on a vertex, an edge (boundary surface) of the block, or the like.

Here, the plurality of points may include a first point to which a first voltage is applied and a second point to which a second voltage which is greater than the first voltage is applied, and the voltage which is applied to a specific point may get relatively greater as the specific point gets closer to the second point than the first point.

Hereinbelow, the first point may be described as one of the vertices present on one edge of the block, the second point may be described as another one of the vertices present in the same edge of the same block, and a specific point may be described as a point positioned randomly between the first point and the second point for convenience of description.

For example, when the controller 140 applies a first driving voltage to the first point of the first transparent electrode sheet 131, and a second driving voltage greater than the first driving voltage to the second point of the first transparent electrode sheet 131, voltage of the specific point reduces as the specific point gets closer to the first point (that is, further from the second point), and voltage of the specific point may increase as the specific point gets closer to the second point (that is, further from the first point).

According to an embodiment, the voltage which is applied to a specific point of the first transparent electrode sheet 131 will be described in detail with reference to FIGS. 3A and 3B.

Figure 3A:
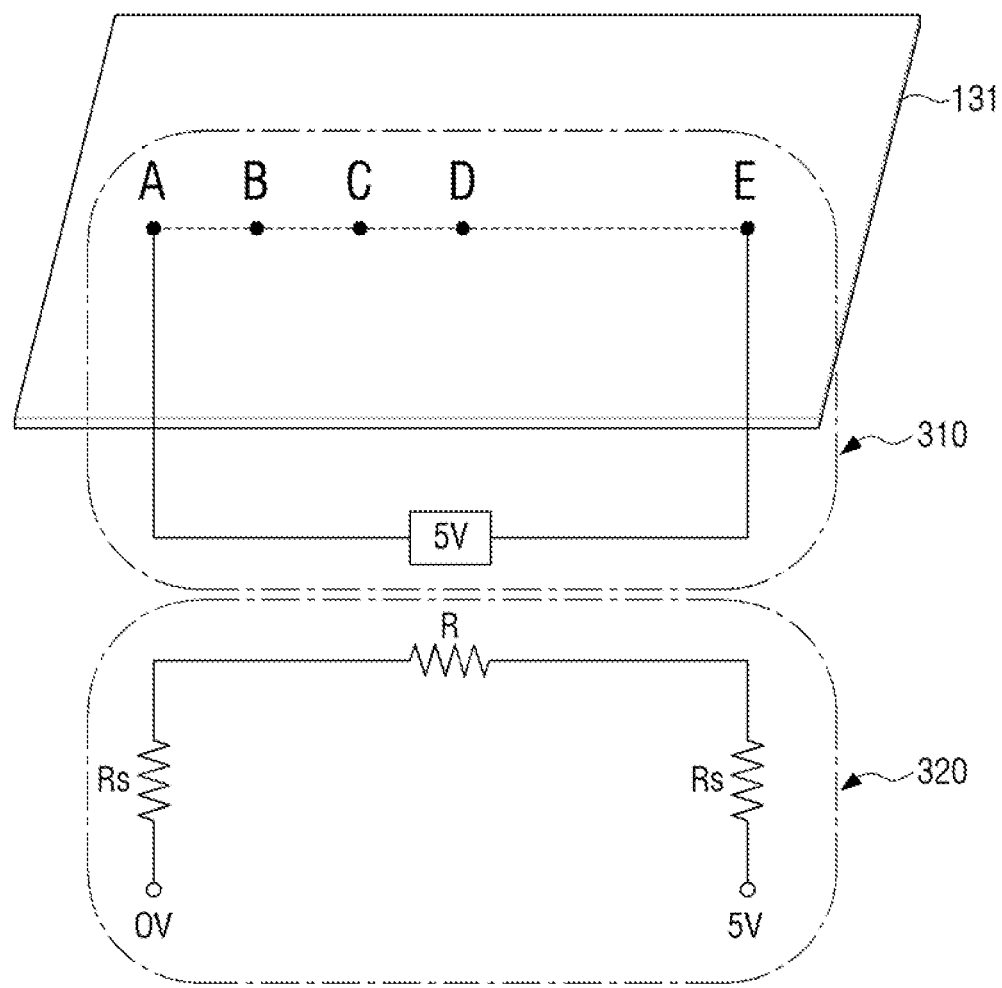
FIG. 3A is a diagram illustrating a driving of a first transparent electrode sheet according to an embodiment of the disclosure.

FIGS. 3A and 3B are diagrams illustrating the driving of a first transparent electrode sheet according to an embodiment.

Referring to FIG. 3A, 0V may be applied to point A of the first transparent electrode sheet 131, and 5V may be applied to point E which is 100 mm spaced apart from point A. Points A, B, C, D and E on the first transparent electrode sheet 131 are points placed on a linear line connecting points A and E. Here, the first transparent electrode sheet 131 may be ITO having surface resistance of 100 ohm/sq. A circuit 310 with respect to the first transparent electrode sheet 131 is equivalent with a circuit 320 shown in a part therebelow, and R may represent resistance, and Rs may represent contact resistance (or surface resistance).

The voltage, resistance and current values measured with respect to each points A and B, points A and C, points A and D, and points A and E on the first transparent electrode sheet 131 is as shown in the table in FIG. 3B. Referring to FIG. 3B, different voltage and resistance values may be obtained according to the position of the specific point on the first transparent electrode sheet 131.

The resistance may have a value according to Equation 1 or Equation 2 below.

$$R = \frac{R_s}{2\pi}\ln(l+1) \quad \text{[Equation 1]}$$

Here, l may be a value representing the point to which the current according to the driving voltage on the first transparent electrode sheet 131 is input and a distance between the points at which the current is output, and l may be a value represented as a positive integer.

Equation 1 above may represent a resistance value between points at which current according to the driving voltage is input and output when the points at which the current according to the driving voltage is input and output is varied. That is, if the size of the block to which the driving voltage is applied increases, the resistance may increase by logarithmic function.

$$R = \frac{R_s}{2\pi}\ln\left(\frac{(l+1)(n+1)}{(l-n)}\right) \quad \text{[Equation 2]}$$

Here, n may be a positive integer representing a distance on the specific points present between the point to which the current according to the driving voltage is input on the first transparent electrode sheet 131 and the point to which the current is output, and may be smaller than l.

Equation 2 above may represent a resistance value on a specific point within the block when the point to which the current according to the driving voltage is input and out is fixed, that is, when the size of the block to which the driving voltage is applied is constant.

In addition, the voltage may have a value proportionate to the resistance which is calculated by Equation 1 or Equation 2 according to Equation 3 below.

$$V = I \times R \quad \text{[Equation 3]}$$

As described above, the voltage which is applied to the specific point on the first transparent electrode sheet 131 may be determined based on the distance between the point to which the driving voltage is applied to the first transparent electrode sheet 131 and the specific point.

Accordingly, voltage which changes continuously (or gradually, gradient behavior) according to the position of the point (or the distance with the point to which the driving voltage is applied) may be applied to the continuing point within the block that is present between the points at which the driving voltage is applied.

The controller 140 may be configured to apply the driving voltage to the block as an alternating current voltage according to a brightness value of the image, and apply the driving voltage to the block so that the voltage of the second transparent electrode sheet 133 may be an average value of a maximum value and a minimum value of the driving voltage. The detailed description thereof will be described below with reference to FIG. 4.

Figure 4:
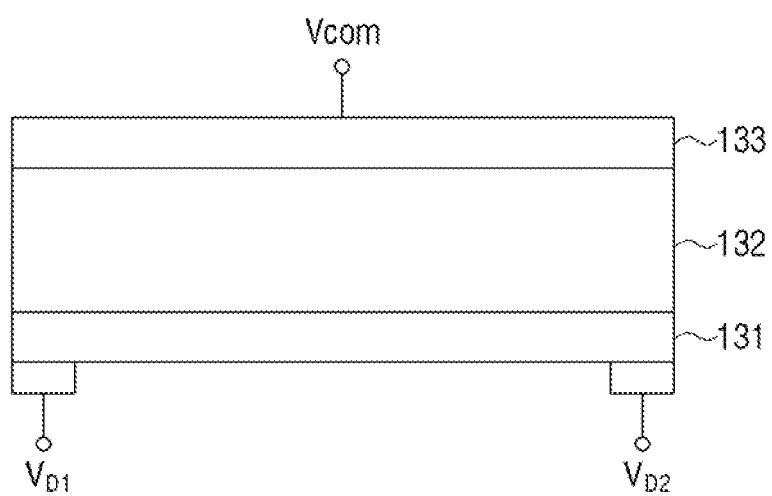
FIG. 4 is a diagram illustrating a method of driving a liquid crystal panel according to an embodiment of the disclosure.

FIG. 4 is a diagram illustrating a method of driving the liquid crystal panel according to an embodiment.

For example, the controller 140 may be configured to control the size of the driving voltage which is applied to the first transparent electrode sheet 131 or control the size of the common voltage which is applied to the second transparent electrode sheet 133 so that the difference of each of the maximum value and minimum value of the driving voltage which is applied to the first transparent electrode sheet 131 and the common voltage are symmetrical (or same) with each other (that is, maximum value of driving voltage−common voltage=common voltage−minimum value of driving voltage) based on the common voltage (Vcom) that is applied to the second transparent electrode sheet 133.

Accordingly, by applying an alternating current voltage symmetrically based on the common voltage, a response rate of the liquid crystal layer 132 may be enhanced and thereby flickering and an after-imaging may be minimized.

Referring to FIG. 4, the controller 140 may be configured to transfer the driving signal to the back light 120, and apply a first driving voltage Vd1 (e.g., 0V) to the first point and a second driving voltage Vd2 (e.g., 15V) to the second point of the block of the first transparent electrode sheet 131. In this case, the state in which the liquid crystal panel 130 is configured to drive and the luminance of light which passed the liquid crystal panel 130 has been illustrated in FIGS. 5A and 5B, and the state in which the display panel 110 is configured to drive has been illustrated in FIG. 6.

In this case, the liquid crystal layer 132 which corresponds to the specific point may be arranged so that the extent to which the liquid crystal is arranged from the first direction to the second direction according to the difference in voltage that is applied to the specific point of the first transparent electrode sheet 131 and the voltage that is applied to the second transparent electrode sheet 133 can be relatively greater.

Specifically, the liquid crystal layer 132 which corresponds to the specific point present continuously between the first point (left side) and the second point (right side) of the block as in FIG. 5 may be arranged so that the extent to which the liquid crystal is arranged from the first direction to the second direction according to the difference in voltage that is applied to the specific point of the first transparent electrode sheet 131 and the voltage that is applied to the second transparent electrode sheet 133 can be relatively greater.

Based on the above-described Equations 1 to 3, as the specific point moves from the left side to the right side direction, the voltage applied to the specific point may increase. Accordingly, the extent to which the liquid crystal layer 132 is arranged from the first direction to the second direction may get relatively greater because the difference in voltage applied to the specific point and the voltage applied to the second transparent electrode sheet 133 increases as the specific point moves from the left side toward the right side direction.

Here, the first and second directions may correspond to the voltage applied to the second transparent electrode sheet 133 and the driving voltage applied to the block of the first transparent electrode sheet 131, respectively.

For example, the first direction may refer to the direction in which the liquid crystals are arranged when the same voltage as with the common voltage which is applied to the second transparent electrode sheet 133 (that is, when the specific point is very close to the point to which the same voltage as with the common voltage is applied) is applied to the specific point of the first transparent electrode sheet 131. For example, it may be a direction vertical to the liquid crystal panel 130.

In addition, the second direction may refer to a direction in which the liquid crystals are arranged when the same voltage as with the driving voltage which is applied to the block of the first transparent electrode sheet 131 is applied (that is, when the specific point is very close to the block to which the driving voltage is applied) to the specific point of the first transparent electrode sheet 131. For example, it may be a direction horizontal to the liquid crystal panel 130.

Here, the first and second directions may refer to directions orthogonal to each other, and may be variously modified and implemented according to the structure of the liquid crystal layer (e.g., homeotropic alignment, homogeneous alignment, etc.).

Figure 5A:
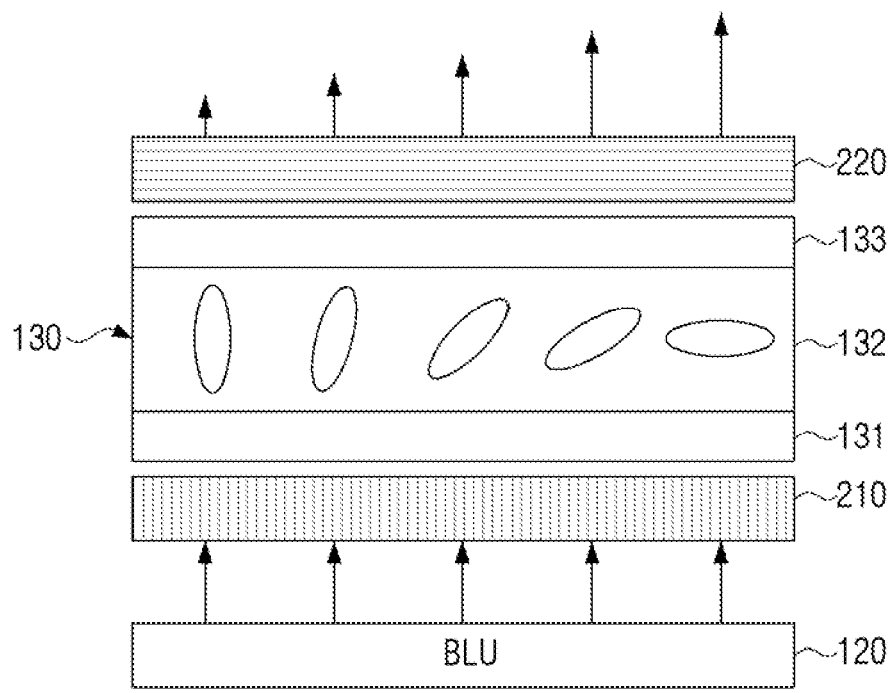
FIG. 5A is a diagram illustrating luminance of light transmitted to a liquid crystal panel according to an embodiment of the disclosure.
Figure 5B:
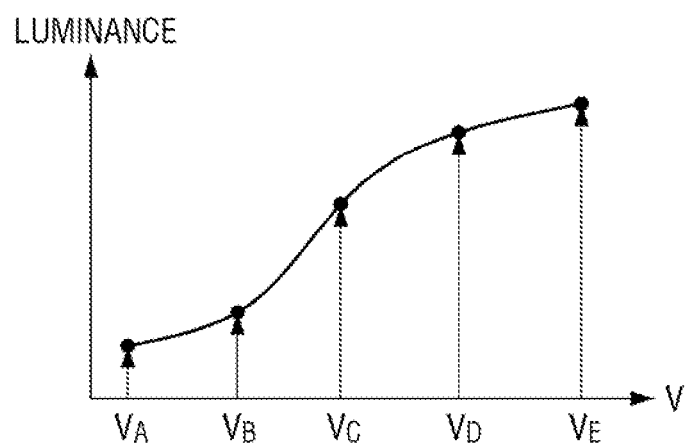
FIG. 5B is a diagram illustrating luminance of light transmitted to a liquid crystal panel according to an embodiment of the disclosure.

Referring to FIGS. 5A and 5B, the luminance of light will be described below in case light emitted by the back light 120 passes the liquid crystal panel 130. At this time, the front surface and the back surface of the liquid crystal panel 130 may be disposed with a first polarizing sheet 210 and a second polarizing sheet 220, and the detailed description thereof will be described below.

Specifically, when the controller 140 applies the first driving voltage (e.g., 0V) to the first point and the second driving voltage (e.g., 15V) to the second point of the block of the first transparent electrode sheet 131, voltage may be applied to the specific point within the block according to the applied first and second driving voltages. The voltage applied to the specific point may be determined based on a distance between the point to which the first and second driving voltages are applied and the specific point.

In this case, the liquid crystal layer 132 which corresponds to the specific point may be arranged from the first direction to the second direction according to the difference in voltage applied to the specific point of the first transparent electrode sheet 131 and the voltage applied to the second transparent electrode sheet 133.

The back light 120 may be configured to emit light to the first polarizing sheet 210 according to the driving signal of the controller 140. The first polarizing sheet 210 may be configured to block light of a different polarization direction with the first polarization direction among the light provided from the back light 120, and provide (transfer) light of the first polarization direction to the liquid crystal layer 132 of the liquid crystal panel 130.

When the light of the first polarization direction transmits (passes) the liquid crystal layer 132, the polarizing state of the light of the first polarization direction may change to a light having a second polarization direction, and the light which passed the liquid crystal panel 130 may reach the second polarizing sheet 220.

Then, the first polarizing sheet 210 may be configured to block light of a different polarization direction with the second polarization direction of the light which passed the liquid crystal panel 130, and provide the light of the second polarization direction to the display panel 110.

For example, as illustrated in FIGS. 5A and 5B, the voltage which is applied to a specific point may increase as the position of the specific point within the block of the first transparent electrode sheet 131 moves from the left side toward the right side direction. For example, the voltage which is applied to the specific point may increase as the specific point gets closer to the second point from the first point.

In this case, the extent of rotation of the liquid crystal may increase because the voltage difference of the first transparent electrode sheet 131 and the second transparent electrode sheet 133 increases as the position of the liquid crystal layer 132 which corresponds to the specific point moves from the left wide toward the right side direction.

Then, when the light of the first polarization direction is transmitted to the liquid crystal layer 132, the polarizing state of light may change to light having a second polarization direction, and as the extent of rotation of the liquid crystal increases, an amount of light having a second polarization direction may increase. That is, the amount of light capable of passing the second polarizing sheet 220 of the light which passed the liquid crystal panel 130 may increase.

Accordingly, the luminance of light which is transmitted through the liquid crystal panel 130 may be continuously increased as the voltage applied to the specific point of the first transparent electrode sheet 131 increases as in FIG. 5B (that is, as it gets closer to the point to which a more greater driving voltage is applied).

The display device 100 may further include a plurality of polarizing sheets.

The plurality of polarizing sheets may be a configuration which transmits light from the back light 120 toward one direction and blocks light of different directions, and a dark parallel line may be generated at certain intervals.

Figure 6:
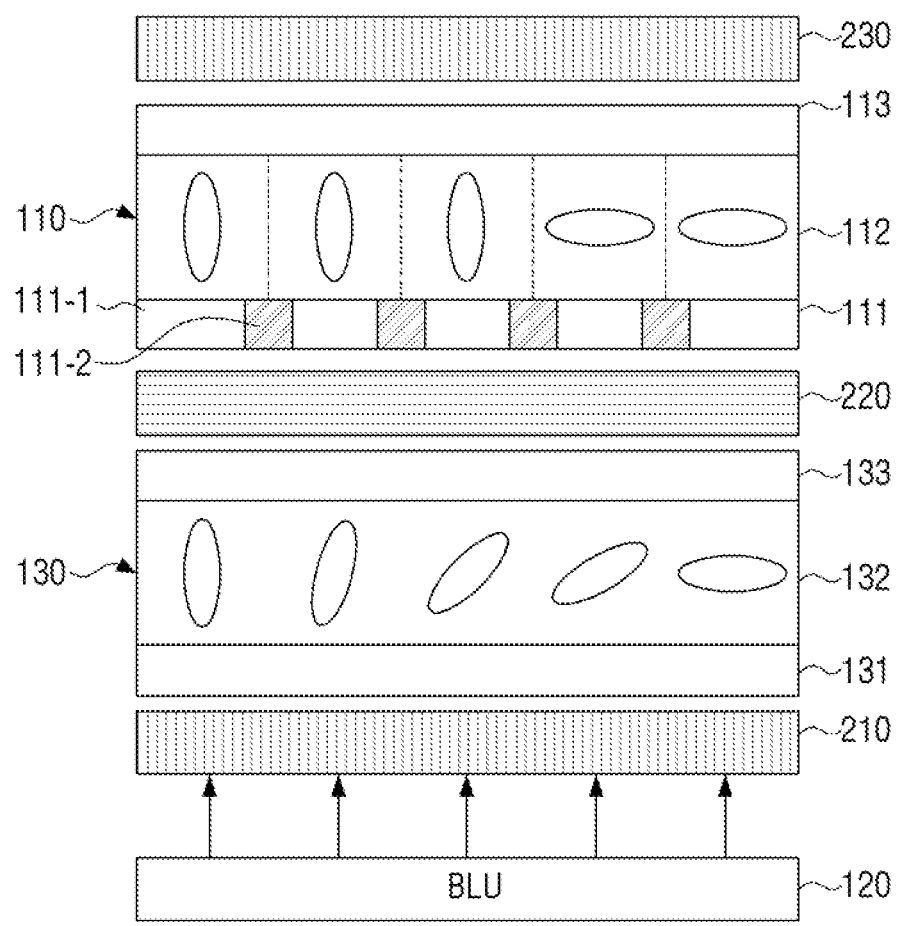
FIG. 6 is a diagram illustrating a display device according to an embodiment of the disclosure.

Referring to FIGS. 5A and 6, the plurality of polarizing sheets may include a first polarizing sheet 210, a second polarizing sheet 220, and a third polarizing sheet 230.

The first polarizing sheet 210 may be disposed between the back light 120 and the back surface of the liquid crystal panel 130 to transmit light of a first polarization direction and block light of a different polarization direction with the first polarization direction among the light provided from the back light 120.

The second polarizing sheet 220 may be disposed between the front surface of the liquid crystal panel 130 and the back surface of the display panel 110 to transmit light of the second polarization direction which is orthogonal with the first polarization direction and block light of a different direction with the second polarization direction of the light which is transmitted through the liquid crystal panel 130.

The third polarizing sheet 230 may be disposed at the front surface of the display panel 110 to transmit light of the first polarization direction and block light of a different direction with the first polarization direction among the light transmitted through the display panel 110.

Referring to FIG. 6, the display panel 110 may include a plurality of pixel electrodes 111, a common electrode 113, and a liquid crystal layer 112. Below, overlapping descriptions with that of the descriptions described above will be omitted and described.

Here, the plurality of pixel electrodes 111 may be formed in pixel units of the display panel 110. The pixel electrode 111-1 may be divided electrically and spatially by an insulation layer 111-2 between different pixel electrodes, and may be driven independently from the other pixel electrodes through the switching device (e.g., Thin Film Transistor (TFT), etc.).

For example, the display panel 110 may be configured such that when voltage greater than the threshold voltage is applied to the gate of the switching device (e.g., TFT) with respect to a specific pixel which the pixel electrode 111-1 is positioned, the driving voltage may be applied to the pixel electrode 111-1.

The display panel 110 may be driven so that the liquid crystal layer 112 formed between the pixel electrode 111-1 and the common electrode 113 is arranged in the first or second direction according to the voltage difference applied to the pixel electrode 111-1 and the common electrode 113. Here, the first or second direction may be in a direction orthogonal to each other. The display panel 110 may be configured so that the liquid crystals are arranged only in the first direction or the second direction unlike the liquid crystal panel 130.

According to an embodiment of the disclosure as described above, based on light emitted from the back light 120 passing a specific area of the liquid crystal layer 132, a display device in which the luminance of light may be continuously changed according to the position at which light is passed within the specific area may be provided.

In addition, the display device 100 of the disclosure may use a display standard (e.g., HD) of the liquid crystal panel 130 of a resolution lower than a display standard (e.g., UHD) of the display panel 110 to enhance contrast ratio and improve visibility on the low resolution boundary surface while lowering manufacturing costs.

Figure 7:
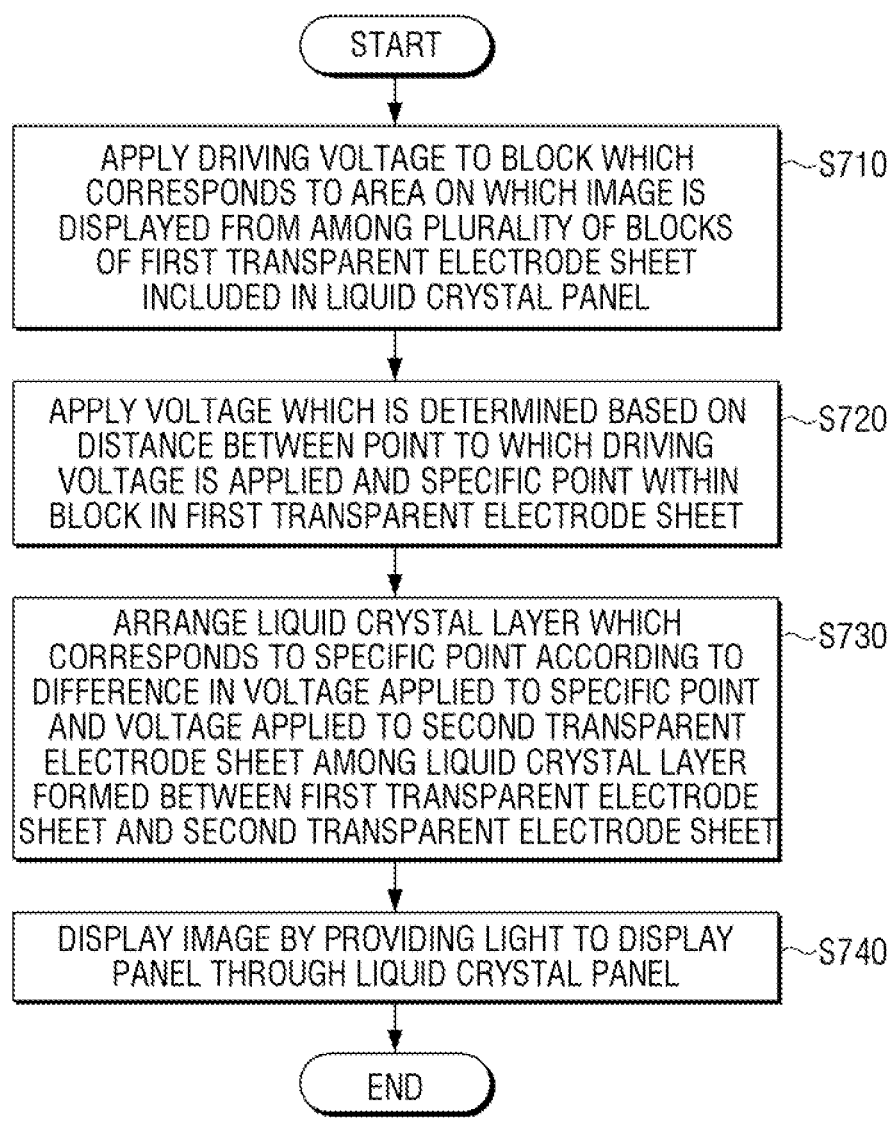
FIG. 7 is a diagram illustrating a flowchart according to an embodiment of the disclosure.

FIG. 7 is a diagram illustrating a flowchart according to an embodiment.

The driving method of the display device according to an embodiment of the disclosure may include applying the driving voltage to the block corresponding to the area on which the image is displayed from among the plurality of blocks of the first transparent electrode sheet included in the liquid crystal panel, applying voltage which is determined based on a distance between the point to which the driving voltage is applied and the specific point within the block to the specific point, arranging the liquid crystal layer which corresponds to the specific point according to a difference in voltage applied to the specific point and the voltage applied to the second transparent electrode sheet among the liquid crystal layer formed between the first transparent electrode sheet and the second transparent electrode sheet, and displaying an image by providing light to the display panel through the liquid crystal panel.

Specifically, the driving voltage may be applied to the block which corresponds to the area on which the image is displayed from among the plurality of blocks of the first transparent electrode sheet included in the liquid crystal panel (S710).

The step of applying the driving voltage may include applying the driving voltage to the plurality of points of the first transparent electrode sheet which correspond to the block.

The plurality of points may include the first point to which the first voltage is applied and the second point to which the second voltage which is greater than the first voltage is applied.

The step of applying the driving voltage may include applying the driving voltage to the block as alternating current voltage according to the brightness value of the image, and applying the driving voltage to the block so that the voltage of the second transparent electrode sheet 133 can be the average value of the maximum value and the minimum value of the driving voltage.

Then, the voltage which is determined based on the distance between the point to which the driving voltage is applied and the specific point within the block in the first transparent electrode sheet may be applied to the specific point (S720).

The voltage applied to the specific point may get relatively greater as the voltage which is applied to the specific point gets closer to the second point than the first point.

The liquid crystal layer corresponding to the specific point may be arranged so that the extent to which the liquid crystal is arranged from the first direction to the second direction according to the difference in voltage that is applied to the specific point and the voltage that is applied to the second transparent electrode sheet can be relatively greater.

The first and second directions may correspond to the voltage applied to the second transparent electrode sheet and the driving voltage applied to the block of the first transparent electrode sheet, respectively.

Then, the liquid crystal layer corresponding to the specific point may be arranged according to the difference in voltage applied to the specific point and the voltage applied to the second transparent electrode sheet among the liquid crystal layer formed between the first transparent electrode sheet and the second transparent electrode sheet (S730).

Then, the image may be displayed by providing light to the display panel through the liquid crystal panel (S740).

Specifically, the displaying the image may include displaying the image by providing light of the first polarization direction to the liquid crystal panel by blocking light of a different polarization direction with the first polarization direction among the light provided by the back light, providing light of the second polarization direction to the display panel by blocking light of a different direction with the second polarization direction which is orthogonal with the first polarization direction of the light (light transmitted through the liquid crystal panel) provided to the liquid crystal panel, and blocking light of a different direction with the first polarization direction and transmitting light of the first polarization direction of the light (light transmitted through the display panel) provided to the display panel.

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to the above-mentioned embodiments. Based on the instruction being executed by the processor, the processor may directly or under the control of the processor perform a function corresponding to the instruction using different elements. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored and data temporarily being stored in the storage medium.

A method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

Each elements (e.g., a module or a program) according to various embodiments may be comprised of a single entity or a plurality of entities, and some sub-elements of the above-mentioned sub-elements may be omitted or other sub-elements may be further included in various embodiments. Alternatively or additionally, some elements (e.g., modules or programs) may be integrated into one entity to perform the same or similar functions performed by each of the elements prior to integration. Operations performed by a module, program, or other element, in accordance with various embodiments, may be performed sequentially, in parallel, repetitively, or in a heuristically manner, or at least some operations may be performed in a different order, omitted, or may add a different operation.

What is claimed is:

1. A display device, comprising:
    a display panel configured to display an image;
    a back light configured to provide light to the display panel;
    a liquid crystal panel configured to be disposed between the display panel and the back light, and comprise a first transparent electrode sheet, a second transparent electrode sheet, and a liquid crystal layer formed between the first and second transparent electrode sheets and arranged according to a voltage difference applied to the first and second transparent electrode sheets; and
    a controller configured to apply a driving voltage to a block corresponding to an area of the display panel on which the image is displayed from among a plurality of blocks of the first transparent electrode sheet,
    wherein a voltage applied to a specific point within the block is determined based on a distance between a point to which the driving voltage is applied and the specific point in the first transparent electrode sheet,
    wherein, based on the voltage applied to the specific point being same as a voltage applied to the second transparent electrode sheet, the liquid crystal layer corresponding to the specific point is arranged according to a first direction,
    wherein, based on the voltage applied to the specific point being same as the driving voltage applied to the block of the first transparent electrode sheet, the liquid crystal layer corresponding to the specific point is arranged according to a second direction, and
    wherein, as a difference between the voltage applied to the specific point and the voltage applied to the second transparent electrode sheet increases, an extent to which the liquid crystal layer corresponding to the specific point is arranged from the first direction to the second direction increases.

2. The display device of claim 1, wherein the controller is configured to apply the driving voltage to a plurality of points of the first transparent electrode sheet corresponding to the block.

3. The display device of claim 2, wherein the plurality of points comprise a first point to which a first voltage is applied and a second point to which a second voltage greater than the first voltage is applied, and
    the voltage which is applied to the specific point is characterized in that the voltage applied to the specific point gets relatively greater as the specific point gets closer to the second point than the first point.

4. The display device of claim 3, wherein an extent to which the liquid crystal layer which corresponds to the specific point is arranged is characterized by the extent to which the liquid crystal layer is arranged from the first direction to the second direction getting relatively greater as the specific point gets closer to the second point than the first point.

5. The display device of claim 1, wherein the controller is configured to apply the driving voltage to the block as an alternating current voltage according to a brightness value of the image, and apply the driving voltage to the block for the voltage of the second transparent electrode sheet to be an average value of a maximum value and a minimum value of the driving voltage.

6. The display device of claim 1, further comprising:
    a plurality of polarizing sheets,
    wherein the plurality of polarizing sheets comprise:
    a first polarizing sheet configured to be disposed between the back light and a back surface of the liquid crystal panel to transmit light of the first polarization direction and block light of a different polarization direction with the first polarization direction among the light provided from the back light;
    a second polarizing sheet configured to be disposed between a front surface of the liquid crystal panel and a back surface of the display panel to transmit light of a second polarization direction orthogonal with the first polarization direction and block light of different directions with the second polarization direction among the light transmitted through the liquid crystal panel; and
    a third polarizing sheet configured to be disposed at a front surface of the display panel to transmit light of the first polarization direction and block light of a different direction with the first polarization direction among the light transmitted through the display panel.

7. A driving method of a display device, the method comprising:
    applying a driving voltage to a block corresponding to an area on which an image is displayed from among a plurality of blocks of a first transparent electrode sheet comprised in a liquid crystal panel;
    applying a voltage which is determined based on a distance between a point to which the driving voltage is applied and a specific point within the block in the first transparent electrode sheet to the specific point;
    arranging a liquid crystal layer corresponding to a specific point according to a difference in a voltage applied to the specific point and a voltage applied to a second transparent electrode sheet among the liquid crystal layer formed between the first transparent electrode sheet and the second transparent electrode sheet; and
    displaying the image by providing light to a display panel through the liquid crystal panel by a back light,
    wherein, based on the voltage applied to the specific point being same as a voltage applied to the second transparent electrode sheet, the liquid crystal layer corresponding to the specific point is arranged according to a first direction,
    wherein, based on the voltage applied to the specific point being same as the driving voltage applied to the block of the first transparent electrode sheet, the liquid crystal layer corresponding to the specific point is arranged according to a second direction, and
    wherein, as a difference between the voltage applied to the specific point and the voltage applied to the second transparent electrode sheet increases, an extent to which the liquid crystal layer corresponding to the specific point is arranged from the first direction to the second direction increases.

8. The method of claim 7, wherein the applying the driving voltage comprises applying the driving voltage to a plurality of points of the first transparent electrode sheet corresponding to the block.

9. The method of claim 8, wherein the plurality of points comprise a first point to which a first voltage is applied and a second point to which a second voltage greater than the first voltage is applied, and the voltage which is applied to the specific point is characterized in that the voltage applied to the specific point gets relatively greater as the specific point gets closer to the second point than the first point.

10. The method of claim 9, wherein an extent to which the liquid crystal layer which corresponds to the specific point is arranged is characterized by the extent to which the liquid crystal layer is arranged from the first direction to the second direction getting relatively greater as the specific point gets closer to the second point than the first point.

11. The method of claim 7, wherein the applying the driving voltage comprises applying the driving voltage to the block as an alternating current voltage according to a brightness value of the image, and applying the driving voltage to the block for the voltage of the second transparent electrode sheet to be an average value of a maximum value and a minimum value of the driving voltage.

12. The method of claim 7, wherein the displaying the image comprises:
    providing light of the first polarization direction to the liquid crystal panel by blocking light of a different polarization direction with the first polarization direction among the light;
    providing light of a second polarization direction to the display panel by blocking light of a different direction with the second polarization direction orthogonal with the first polarization direction among the light provided to the liquid crystal panel; and
    displaying the image by transmitting light of the first polarization direction by blocking light of a different direction with the first polarization direction among the light provided to the display panel.

* * * * *